United States Patent
Landrum, Jr.

[15] 3,698,508
[45] Oct. 17, 1972

[54] PHASE CONTROL OF SERVO HYDRAULIC VIBRATORS
[72] Inventor: Ralph A. Landrum, Jr., Tulsa, Okla.
[73] Assignee: Amoco Production Company
[22] Filed: Dec. 28, 1970
[21] Appl. No.: 101,571

[52] U.S. Cl..........181/.5 H, 181/.5 EC, 340/15.5 TC, 73/71.5
[51] Int. Cl..............................................G01v 1/14
[58] Field of Search...181/.5 EC, .5 H; 340/15.5 CC, 340/15.5 TA, 15.5 TC, 15.5 TD; 73/71.5, 71.6

[56] References Cited
UNITED STATES PATENTS

| | | | |
|---|---|---|---|
| 3,219,971 | 11/1965 | Cole | 340/15.5 R |
| 3,404,561 | 10/1968 | Ratz | 73/71.6 |
| 3,578,102 | 5/1971 | Ross et al. | 181/.5 H |
| 3,100,393 | 8/1963 | Bell | 73/71.6 |

*Primary Examiner*—Benjamin A. Borchelt
*Assistant Examiner*—N. Moskowitz
*Attorney*—Paul F. Hawley and Newell Pottorf

[57] ABSTRACT

In seismic geophysical surveying using a servo-controlled vibrator as the energy source for transmitting a predetermined varying-frequency seismic wave train into the earth, ground-coupling distortion and vibrator inefficiency at low frequencies cause loss of phase lock so that the vibrator no longer follows the reference or pilot signal. This problem is solved by interposing a filter with a varying frequency cutoff that passes the varying reference frequency in the feedback from the vibrator base plate, but rejects the distorting harmonic frequencies. The reference signal can be transmitted from a remote recording point, but preferably it is generated from a stored program or from frequency-change data at the vibrator vehicle, triggered from the remote recording point.

4 Claims, 2 Drawing Figures

INVENTOR.
RALPH A. LANDRUM, JR.
BY Newell Pottny
ATTORNEY 3,698,508

PHASE CONTROL OF SERVO HYDRAULIC VIBRATORS

FIELD OF THE INVENTION

This invention relates to seismic geophysical surveying and is directed to surveying by use of a vibrator as the generator of seismic waves. More particularly, the invention is directed to a phase-locking system for servo-vibrators effective to extend the operating range to substantially lower frequencies than are possible with prior-art systems. Specifically, the invention comprises an improved phase-locking vibrator control system together with a novel reference signal generator of high accuracy.

BACKGROUND OF THE INVENTION

In seismic geophysical surveying utilizing as the source of seismic waves a servo-controlled vibrator, the need for maintaining a constant phase relationship between the reference or pilot signal and the output signal of the vibrator transmitted into the ground is fully explained in U.S. Pat. Nos. 3,208,545 and 3,219,971. Particularly in the latter patent it is explained how the phase relationship between the output seismic wave and the input reference signal may vary for different frequencies as well as because of variable ground-coupling conditions. The possible failure to phase-lock due to severe distortion in the vibrator output signal was pointed out, but it was considered that the steps of multiplying and integrating the reference and the output waves to obtain an error signal, and using it to produce a compensating phase shift of the reference would not be affected by the distortion but would depend only on the fundamental frequency. The frequency range cited as that in which the invention was considered operable was from about 15 to 90 Hertz.

I have observed that the phase-lock system of U.S. Pat. No. 3,219,971 is usually effective over this frequency range of 15 to 90 Hertz, but there are times when it is desired to generate signal frequencies considerably below the 15 Hertz limit of the prior art. Two detrimental effects become increasingly effective below 15 Hertz that require consideration: the efficiency and power output of the vibrator fall off markedly, and the signal entering the ground is increasingly distorted by harmonics of the desired fundamental frequency. Furthermore, this distortion, which appears to be associated with the ground-coupling conditions and the varying elastic properties of the ground surface layers, often changes rapidly and unpredictably over the ground surface.

The effect of this large and varying distortion on a phase-lock system such as that of U.S. Pat. No. 3,219,971 is that the automatic gain control in the feedback loop from the vibrator responds to the distortion amplitudes and does not provide a sufficient amplitude of the desired fundamental frequency to the phase-comparing multiplier to develop the necessary phase-error signal. As a result, the integrated-product error signal, which controls the phase-shift circuit, varies in amplitude without any relation to the desired phase relationship so that phase-lock becomes lost, and the vibrator follows the reference signal only in a general way. An especially adverse effect arises when, due to distortion, the system is in a condition which verges on loss of phase-lock. A form of "hunting" occurs as the system leaves and then tries to return to the phase-locked condition, with even greater variations of phase than when no phase control system is used. It may, accordingly, be considered a primary object of my invention to provide an improved phase-locking system which is effective to as low frequencies as it may be desired to operate the vibrator.

SUMMARY OF THE INVENTION

In accordance with my invention, this and other objects are accomplished by incorporating in the feedback circuit from the vibrator base plate a filter which excludes harmonic distortion from the feedback signal which is applied to the phase-comparing multiplier to develop the phase-shafting control voltage. As the desired frequency may vary over a wide range, it is not possible for any simple fixed filter to provide the cutoff of harmonic-distortion frequencies, as a frequency which is distortion at one part of the input signal duration may become the desired frequency at another part of the input. Therefore, the preferred filter is one which may have its frequency response controllably varied during the time of vibrator operation in transmitting one elongated input signal. As such a filter inevitably introduces some time delay and phase-shift characteristics of its own, the effect of this on the phase-controlling error signal is avoided by incorporating a corresponding variable-pass filter in the reference branch of the control circuit feeding the phase-comparing multiplier. It is understood that the filter at this point is not required to perform frequency discrimination for the reason that the reference will normally be undistorted by harmonics, but it is present only to provide the same time delay as the output feedback filter that is required to screen out distorting harmonics.

While there are a number of possible means for controlling the frequency cutoff characteristics of the variable filters, it is preferred to utilize filters which have frequency cutoff characteristics that are controlled by application of an electrical voltage. This voltage may be provided by a circuit in the nature of a frequency discriminator having an output proportional to the instantaneous frequency of the input reference signal, but in a preferred embodiment wherein the reference signal is generated at the vibrator location the control voltage is also generated in conjunction with the reference signal.

The preferred reference-signal generator represents a distinct improvement over prior-art generators in that the reference signal is stored at the vibrator vehicle in the form of frequency-change data rather than as successive amplitudes of the reference wave form. After selection of various parameters of the desired reference wave by the vibrator operator, a coded trigger signal received by radio from the recording point initiates the operation of the reference signal generator which then proceeds under control of its own precision clock-pulse generator. Simultaneously, it provides the control signal necessary for varying the frequency cutoff of the tracking filters.

BRIEF DESCRIPTION OF THE DRAWINGS

This will be better understood by reference to the accompanying drawings forming a part of this application and illustrating a typical and preferred embodiment of the invention. In these drawings.

DETAILED DESCRIPTION OF THE DRAWINGS

Figure 1:
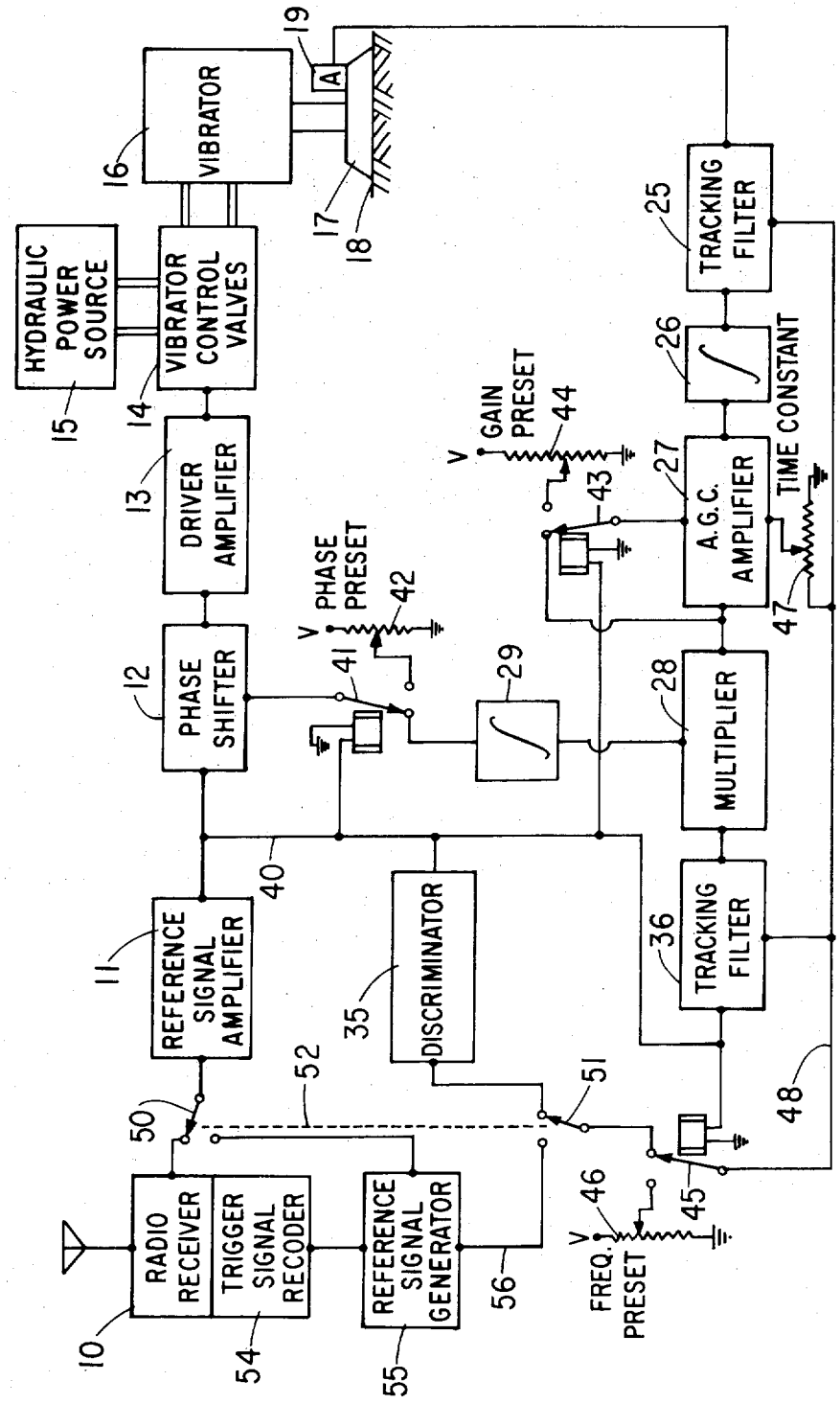
FIG. 1 is a block wiring diagram of the phase-lock system of the invention.

Referring now to FIG. 1 in detail, this figure shows in block-diagram form the chief elements of the phase-lock control system associated with each vibrator and vibrator vehicle. A radio receiver 10 is provided for receiving from a remote recording point communications including a reference signal, which signal when detected is amplified by a reference signal amplifier 11 connected to an output of receiver 10. The output of amplifier 11 goes to a phase-shifter 12 and thence to a driver amplifier 13, which operates valves 14 to control the flow of hydraulic power from a source 15 to a vibrator 16 so as to cause reciprocation of the vibrator base plate 17 in contact with the earth 18. The motions resulting from the driving force of vibrator 16 and reaction of ground 18 on base plate 17 are picked up by an attached accelerometer 19, which feeds a tracking filter 25, the output of which goes to an integrator 26. The output of integrator 26 has its gain adjusted by an automatic gain control amplifer 27 and is then applied as one input to a multiplier 28, the output of which, integrated by a circuit 29, constitutes the phase-error signal going to the control terminal of phase shifter 12.

By a lead 40, the output of reference signal amplifier 11 is taken directly to a second tracking filter 36 and thence to the multiplier 28 as its second input. Also connected to the output lead 40 of reference signal amplifier 11 is a frequency discriminator 35, the output of which constitutes a control voltage applied to the frequency control terminals of tracking filters 25 and 36. In order to minimize the time for the phase-locking system to become operative after the start of a reference signal, certain presetting voltages are provided which are in effect until the reference signal appears on amplifier output lead 40. Thus, an initial phase shift value for shifter 12 is established by a relay 41 which maintains connection to a variable voltage source 42 until voltage appears on lead 40 and throws relay contactor 41 to the position shown in the drawing. Likewise, the initial gain of amplifier 27 is established by a preset voltage 44 acting through a relay contactor 43 until signal appears on the lead 40 to shift contactor 43 to the position shown. Similarly, an adjustable frequency-control voltage from a source 46 proportional to the initial frequency of the reference signal is applied by the relay 45 via lead 48 to the tracking filters 25 and 36 until relay 45 operates by the presence of signal on lead 40 to establish connection to discriminator 35. In addition to controlling the cutoff of filters 25 and 36, the time constant of amplifier 27 is adjusted according to the instantaneous frequency of the reference by a voltage divider 47 energized by the frequency-control voltage.

The connection between receiver 10 and amplifier 11 includes a double-throw switch 50, while a similar switch 51 is included between the output of discriminator 35 and frequency-control lead 48. Switches 50 and 51 may be interconnected as at 52 for simultaneous operation. Radio receiver 10 includes a trigger-signal decoding section 54 connected to a reference signal generator 55 having two output leads, one lead 56 going to the frequency-control voltage lead 48, and a reference signal output lead 57 going to reference signal amplifier 11, when switches 50 and 51 are thrown to the positions opposite those illustrated by the drawing.

The operation of the circuit of FIG. 1 corresponds generally to that of FIG. 1 of U.S. Pat. No. 3,219,971 insofar as the over-all circuit is concerned. That is, with switches 50 and 51 in the position shown in the drawing, the reference signal received over radio 10 is amplified by amplifier 11 and passes through phase shifter 12 to driver amplifier 13 so as to operate control valves 14 regulating the flow of hydraulic power from source 15 to vibrator 16 in accordance with the frequency and amplitude of the reference signal. An electrical signal representing the true motion of vibrator base plate 17, as driven by vibrator 16 and as affected by the reaction of earth 18, is detected by accelerometer 19 and, in accordance with the present invention, is passed through tracking filter 25 to integrator 26. The output of integrator 26, which corresponds to the velocity of motion of base plate 17, is amplified by automatic gain control amplifier 27 and goes to one input of multiplier 28. At the same time, a signal directly from amplifier 11 is transmitted over lead 40 to tracking filter 36 and thence to the other input of multiplier 28. As in prior-art Pat. No. 3,219,971, the output of the multiplier, after integration by integrator 29, constitutes an error signal varying in magnitude with the phase difference between the reference and the base-plate 17 signals, and in polarity with the direction of phase deviation of the latter. Also, as in the prior art, it produces a shift of the reference in shifter 12 to compensate for any change in the phase difference between the base-plate velocity signal and the reference from amplifier 11.

In accordance with the present invention, the reference signal on lead 40 is also applied to the input of a discriminator circuit 35 which produces a direct-current voltage output proportional to the input frequency. This direct-current output voltage is applied through switch 51 and relay contactor 45 to lead 48 and thence to the control terminals of tracking filters 36 and 25. These are typically low-pass filters, and it is the function of the control voltage applied to them to maintain their frequency cutoff between the reference fundamental frequency and its second harmonic. Thus, harmonic distortion, which is of increasing amplitude at lower frequencies in the signal from accelerometer 19, is prevented from reaching amplifier 27 and affecting its gain which is then chiefly determined not by the harmonic distortion but by the fundamental frequency. With filter 25 in operation, therefore, amplifier 27 responds to the fundamental-frequency component of the accelerometer signal to raise it to a constant level for application to multiplier 28. Accordingly, the error signal from integrator 29 is primarily dependent only upon the phase of the reference component in the output of accelerometer 19 even though the accelerometer output is partly or even chiefly harmonic distortion.

While a wide variety of variable-frequency filters and analogous devices can be adapted to function as the tracking filters 25 and 36, it is preferred that they be an active voltage controlled type such as those manufactured by the Aritech Corp., 130 Lincoln Street, Boston, Mass. 02135. Their type 24 BLP 10-500/0 is a 4-pole Butterworth design of low-pass filter, with a roll-off of 24 db. per octave above the cutoff frequency, which can be varied from 10 to 500 Hertz by changing the DC control voltage from 0.1 to 5.0 volts.

Because of the increased frequency range over which this phase-lock circuit is effective, and particularly the low frequencies at which it can operate, the time constant of amplifier 27 is advantageously varied by the frequency-proportional voltage on lead 48, as applied to a voltage divider 47, to relatively lengthen the amplifier time constant at low frequencies so as to maintain it longer than the period of the reference fundamental, as otherwise the gain would vary with the instantaneous amplitudes of the reference wave form. For intermediate and high frequencies of the reference, the amplifier has a shorter time constant so as more rapidly to follow average amplitude variations. This might be accomplished in one of many ways, such as, for example, varying the illumination of a photo-resistor shunting the integrating condenser to shorten the time constant as the frequency rises. The time constant may, in fact, then be shorter than the period of the desired low-frequency waves and is thus not appropriate for gain control of low frequencies.

When it is desired to generate the reference signal at the vibrator vehicle, switches 50 and 51 are thrown to connect lead 57 to amplifier 11, and lead 56 to lead 48. From the remote recorder, a coded trigger signal is transmitted to receiver 10 and is detected by decoder 54 which transmits an initiating impulse to generator 55. Receiver 10 and decoder 54 may be the remote control firing system Model RCF-1B manufactured by Electro-Technical Labs Division of Mandrel Industries, Inc., 6069 Southwest Freeway, Houston, Tex. 77036, which closes a relay or emits a pulse upon receipt of a particular coded signal from the recording unit. Thereafter, under control of its internal clock, the desired reference signal is generated by generator 55 and transmitted over lead 57 to amplifier 11. Simultaneously, a DC voltage proportional to the instantaneous frequency is transmitted via lead 56 to filter-control lead 48. The phase-locking circuit operates exactly as when under control of the reference signal received over radio 10, except that discriminator 35 is not required to furnish the filter-control voltage.

Figure 2:
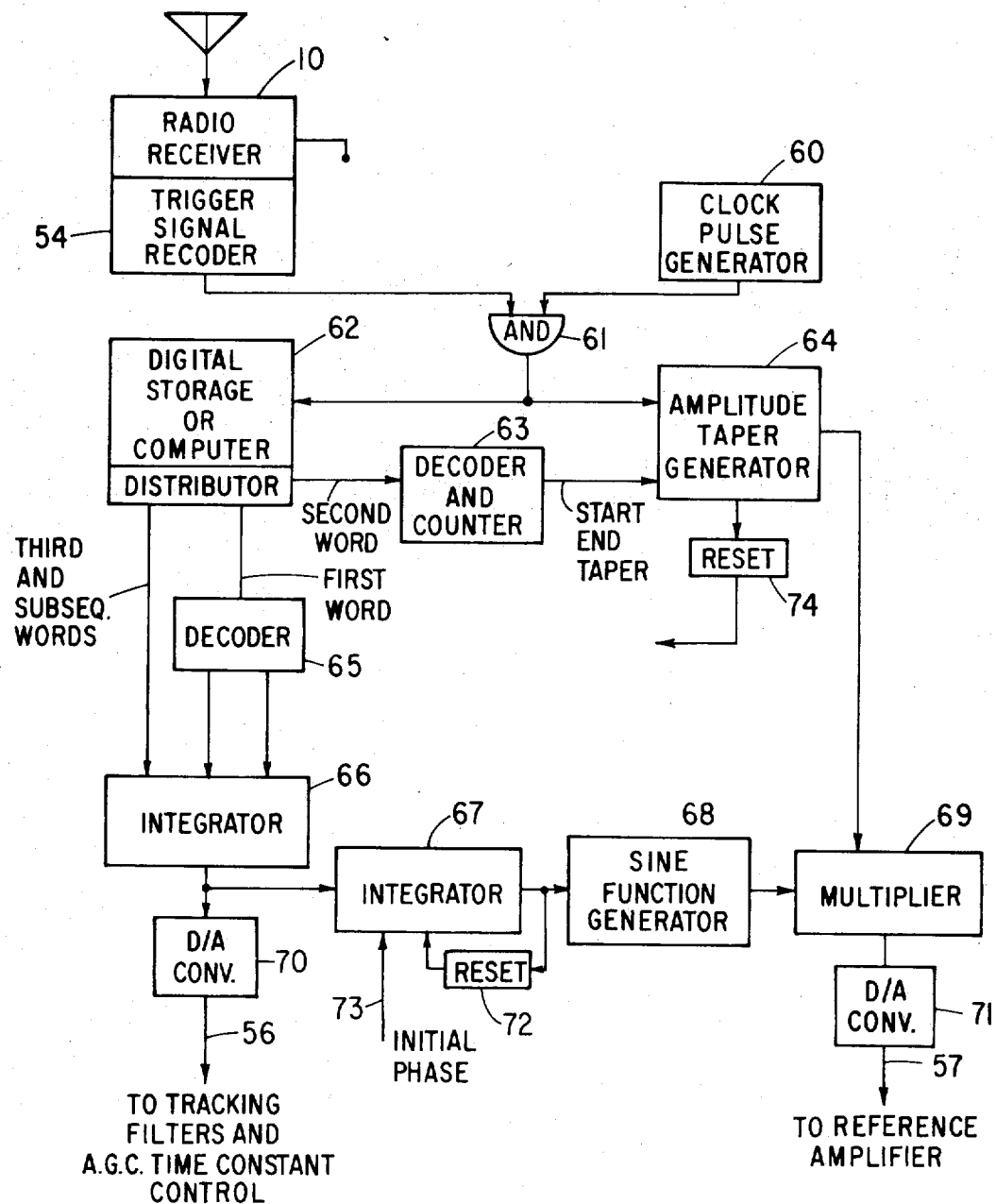
FIG. 2 is a block wiring diagram of a preferred form of reference signal generator for use in the phase-locking system of FIG. 1.

Turning now to FIG. 2, this figure shows a preferred embodiment of the reference signal generator 55. Clock pulses are produced at a suitable precise rate, such as 1 per millisecond, by a generator 60 connected to one input of a latching AND gate 61, the other input of which is connected to the output of trigger pulse decoder 54. Upon receipt of a coded signal from the remote recorder, decoder 54 transmits a pulse to gate 61 which opens and latches it open so that clock pulses from generator 60 are thereafter transmitted to units 62, 63 and 64.

Unit 62 is typically a digital storage device such as a magnetic drum, core storage, tape loop, or the like, into which has been preloaded one or more particular sets of numbers, any selectable set of which can be read out in sequence by the successive clock pulses. Preferably, after the first two words of a typical set in unit 62, the numbers of the set represent, not amplitude values of a pilot signal as in the prior art, but rather the change in frequency of the pilot signal per unit of clock-pulse time. Since in the usual seismic-surveying operation with a varying-frequency signal, the change in frequency per unit of clock-pulse time is typically a small part of 1 Hertz, only a relatively few bits per word of frequency change are necessary for quite high precision as compared with the substantial number of bits required for specifying each successive instantaneous wave-amplitude value as in the prior art. This makes practical the use of a considerably smaller storage capacity than is required in the prior-art generator; or in the alternative a given size of storage can hold a greater number and variety of frequency-change number series.

Unit 63 functions primarily to set the time duration of each period of vibrator-signal generation. The unit 63 essentially is a presettable counter similar in function to a Berkely/Beckman preset E-put meter, Model 554, manufactured by Beckman Instruments, Inc., 2200 Wright Avenue, Richmond 4, Calif. After the preset number of counts representing vibrator signal duration have been registered, counter 63 transmits a signal-terminating pulse to the unit 64, which then functions to reduce the reference signal amplitude gradually to zero.

Unit 64, therefore, is typically an arithmetic-function generator that produces the front-end and back-end amplitude modulation or taper functions for the pilot signals. Any particular taper function is preprogrammed and may be a plug-in box which is replaceable by a different box when it is desired to change the taper function. For example, if it is desired to create a 50-millisecond linear amplitude taper at each end of the pilot signal, the remainder of the signal to have constant amplitude, the initial clock pulse transmitted to unit 64 from gate 61 starts a binary counter in unit 64 which increments on each count for a total of 50 counts, assuming a 1 millisecond count interval. This increment counter is connected to an output register of unit 64 which holds at its output terminal the binary number present on the counter until such time as the signal-terminating impulse is received from unit 63, whereupon another counter of unit 64 starts and decrements the output register back to zero so that the pilot signal ends. In this way, the setting of counter 63 effectively establishes the length of the pilot signal, minus the length of the end-taper function. As the binary number present in the output register of unit 64 is available on its output lead as one input to the multiplier 69, this establishes both the maximum amplitude and the varying amplitudes at the tapered beginning and end of the reference or pilot signal.

Digital storage unit 62 normally includes a switching or distributing section which sends the first word out of a stored-number set to a decoding unit 65 and the second stored word to the presettable counter unit 63 to preset it to the number establishing the desired length of the pilot signal in clock-pulse units. The third and subsequent words read out of storage on the third and following clock pulses, representing frequency changes, are transmitted to an integrator 66. In the usual preferred form of program, the first word going to decoder 65 contains both magnitude and sign bits. The magnitude bits represent the desired value of initial frequency for the pilot signal, while the sign bits establish whether the initial signal is to be increased or decreased in frequency and thus establishes whether the pilot is an upsweep or downsweep in form. Decoder 65, therefore, may be simply a buffer register which stores the magnitude and sign bits of the first word of the number set and uses them to set into arithmetic integrator unit 66 the value representing initial frequency $f_1$ and the sense of operation of unit 66, as to whether it is to increment or decrement the subsequent frequency-change values to the initial set-in value $f_1$. The output of integrator 66 is thus a running value of instantaneous frequency as established by the initial frequency value plus the running sum of all subsequent increments or decrements.

As this value of instantaneous frequency is exactly that desired to control the adjustable cutoff frequency of tracking filters 25 and 36, as well as the time constant of amplifier 27, it is converted to a proportional varying DC voltage by a digital/analog converter 70 and constitutes the output present on lead 56 that is transmitted to the frequency-control lead 48.

The output of integrator 66 is also fed to a second integrator or accumulator 67 which sums all of the successive values of instantaneous frequency into a quantity that corresponds to phase angle. Each time this phase angle quantity reaches a value representing 360° or $2\pi$ radians as indicated at the output of integrator 67, a reset circuit 72 resets integrator 67 effectively to zero. It is thus not required to have a large storage capacity. If it is desired that some other initial phase angle than zero be the starting point, as when two or more vibrators are to be operated in synchronism except for a constant small corrective relative phase shift, then an initial value of phase angle can be introduced as suggested by arrow 73, being set in, for example, by thumb-wheel switches, or the like, not shown.

The phase-angle output of integrator 67 forms the input of a sine function generator 68, which at its output produces the sine of this input phase angle. This is precisely the wave form of the desired pilot or reference signal and constitutes the second input to multiplier 69 having as its first input the desired amplitude value produced by unit 64. The output of multiplier 69 is thus in digital form the sine function of varying frequency and constant amplitude except as tapered at the beginning and end by unit 64. This is converted by a digital/analog converter unit 61 to an analog sine wave voltage which forms the reference signal transmitted by lead 57 to amplifier 11 of FIG. 1 for controlling the vibrator 16.

As it is necessary that the generator start from some predetermined initial condition, a reset generator 74 senses the termination of the signal generation by unit 64 and produces resetting impulses for distribution to the various units of generator 55. In particular, trigger signal decoder 54 is reset, ready to receive and decode the next trigger signal from the remote recorder. Gate 61 in unlatched and inhibited, storage unit 62 is returned to its initial condition, counter 63 is returned to zero, as is the taper generator unit 64. The register of decoder 65 is cleared, as are integrators 66 and 67, except for any initial phase represented by 73.

While not shown in detail, it is to be understood that, when the unit 62 is provided with a variety of stored frequency-change number sets or programs, it will also include selection means by which any desired one of them can be selected, either by the operator of the vibrator vehicle as instructed verbally over the radio 10, or by use of a coded signal and a decoder analogous to unit 54. Of particular importance in the use of low-frequency pilot signals is the fact that for these stored programs the rate of change of frequency need not be linear but may be completely arbitrary, for example, so as to compensate for reduced vibrator efficiency at lower frequencies by correspondingly longer signal input times at those frequencies. Thus, it is frequently advantageous to vary the frequency non-linearly in such a way that the ground-input energy, represented by radiated-signal amplitude squared, multiplied by time, is substantially constant at all parts of the input frequency spectrum.

It is believed that the operation of generator 55 is substantially apparent from its foregoing description. That is, upon receipt and decoding of the initiating trigger signal by unit 54, generator 55 runs automatically through its selected stored frequency-change program to produce respective control and signal output voltages on leads 56 and 57, and finally resets itself ready for the next triggering. Being completely digital through the stages of integration necessary to convert the frequency-change data into a phase angle, the operation is accurately repeatable within the precision of clock 60 which can be quite high.

While the invention has been described in detail as applied to a phase-locking system using wave-form comparison of the reference and feedback signals in a multiplier followed by an integrator to derive the error signal, it is equally applicable in other forms of phase-controlling systems that can be adversely affected by the presence of harmonic distortion in the control loop.

I claim:

1. In a system for maintaining substantially constant the phase relation between varying-frequency seismic signals induced in the earth by a servo-hydraulic vibrator and a reference signal controlling said vibrator, wherein a feedback signal representing said induced signals is phase-compared with said reference signal in a phase-comparing means which produces an error signal, and said error signal is used to produce a compensating phase shift of said reference signal tending to minimize the amplitude of said error signal, said feedback signal being amplified to a substantially constant level before passing to said phase-comparing means, the improvement comprising passing said feedback signal through a first variable-pass filter prior to amplifying it to said substantially constant level, passing said reference signal through a second variable-pass filter substantially matching said first filter prior to entering said phase-comparing means, and, during the time of inducing said varying-frequency signals in the earth, varying the pass of said filters to pass said reference signal and maintain filter cut-off between the instantaneous frequency of said reference signal and the harmonics of said instantaneous frequency, whereby substantially only the fundamental frequency component of said reference signal is amplified to said constant level.

2. In a system as in claim 1, the improvement as in claim 1 including the further step of varying the time constant of said constant-level amplification in proportion to the period of said instantaneous frequency of said reference signal.

3. In a system as in claim 1, the improvement as in claim 1 including the further steps of summing digital values representing an initial frequency and a series of subsequent frequency changes per digital time unit to obtain a series of first sums representing instantaneous frequencies, summing successive values of said first sum to obtain a second digital value representing phase angle, and applying said second digital value as input to a sine-function generator to obtain said reference signal as an output.

4. In a system as in claim 1, the improvement as in claim 3 including the further steps of converting said series of first sums to a proportional direct-current voltage, and applying said voltage to said filters to vary the pass thereof.

* * * * *